United States Patent [19]
Shono

[11] 3,978,503
[45] Aug. 31, 1976

[54] LIGHT SHIELD MECHANISM FOR QUADRILATERAL OPENING

[75] Inventor: Tetsuji Shono, Saitama, Japan

[73] Assignee: Asahi Kogaku Kabushiki Kaisha, Tokyo, Japan

[22] Filed: Oct. 1, 1975

[21] Appl. No.: 618,599

[30] Foreign Application Priority Data
Oct. 4, 1974 Japan............... 49-120084[U]

[52] U.S. Cl............................. 354/250; 350/272
[51] Int. Cl.² ............... G03B 9/00; G05D 25/00
[58] Field of Search................. 354/226, 250, 253; 350/266, 272

[56] References Cited
UNITED STATES PATENTS
| | | | |
|---|---|---|---|
| 2,507,149 | 5/1950 | Fuerst | 354/253 |
| 2,887,027 | 5/1959 | Rentschler | 354/253 |

Primary Examiner—Joseph F. Peters, Jr.
Attorney, Agent, or Firm—Sughrue, Rothwell, Mion, Zinn and Macpeak

[57] ABSTRACT

A rotatable member overlying a relatively fixed member has a quadrilateral window corresponding to a similar quadrilateral window within the fixed member through which passes the pivot axis of the rotating member. The rotating member controls movement of a pair of shield blades movable towards and away from each other from opposite sides of the window within the fixed member such that light shielding of the optical path through the fixed member window is effected partially by overlapping of the window frame portion of the rotating member relative to the window frame portion of the fixed member and the remaining portion of the fixed window is covered by the shield blades.

4 Claims, 3 Drawing Figures

LIGHT SHIELD MECHANISM FOR QUADRILATERAL OPENING

BACKGROUND OF THE INVENTION

1. Field of the Invention

This invention relates to a light shielding mechanism for a quadrilateral opening and more particularly to a light shield mechanism for such an opening within a single lens reflex camera and the like.

2. Description of the Prior Art

In single lens reflex cameras, provided with a mechanism for automatically determining the aperture size or the extent of the exposure time or similar parameters in accordance with photographing conditions such as the brightness of the field to be photographed, the camera employs an internal light receiving photometric system in which a photosensitive portion for measuring the light within the field to be photographed arranged within the region of the light path emanating from the field to be photographed and transmited through an image lens in order to determine the aforementioned parameters for film exposure. However, it is not possible to disregard the influence of counter-incident light which falls on the light path from the eyepiece portion of the view finder optical system. Particularly where the eye piece portion is exposed when the photograph is taken by means of a self-timer or remote control mechanism, a relatively large error is produced by the presence of the counter-incident light acting on the light being measured relative to the field being photographed.

For this reason, it is often required that a mechanism be provided for shielding the view finder eyepiece in single lens reflex cameras and the like, and it is further necessary to add such a mechanism for shielding a light projection optical system when a slide change is being effected within a slide projector to thereby enhance projection effects, and similarly it is often required that such a shield mechanism be provided within optical illumination systems in telescopic photograhic apparatus or the like.

It is, therefore, an object of the present invention to provide a light shield mechanism for a camera view finder eyepiece and the like which reduces the area of the shield blades incorporated within said mechanism where the optical path across which the light shield is employed comprises a quadrilateral opening such as a rectangle or the like.

It is a further object of the present invention to provide an improved shield mechanism which minimizes the space required for the shield blades within the periphery about the quadrilateral light path opening and to provide a light sield mechanism which is both simple in construction and which readily attains the desired light shielding function.

SUMMARY OF THE INVENTION

The present invention constitutes a light shield mechanism for selective exposure and closing of a light path through a relatively fixed member having a first window therein forming a quadrilateral opening. The mechanism comprises a rotatable member mounted coplanar to the first member for rotation about an axis passing through said first opening and having in turn a second window defining a quadrilateral light path opening therein. Shield blades mounted for rotation on said fixed member to the side of the first window and responsive to relative rotation of the members selectively close off the quadrilateral light path openings within the members being such that the window of the rotatable member cocks relative to the window of the fixed member and the frame overlaps at least one portion of the first window and the remainder of the first window is covered by the pivotable blades during such relative rotation.

The features of the present invention will further be described in detail in conjunction with a preferred embodiment shown in the drawings.

DESCRIPTION OF THE PREFERRED EMBODIMENT

Figure 1:
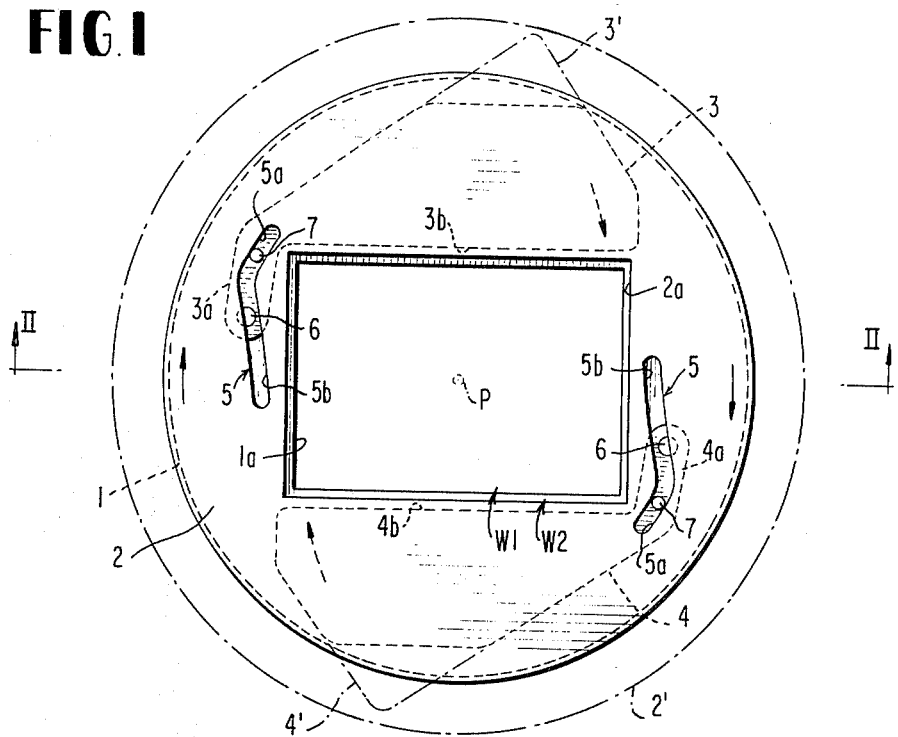
FIG. 1 is a plan view of one embodiment of the light shield mechanism of the present invention, with quadrilateral openings aligned and opened and shield blades retracted.
Figure 2:
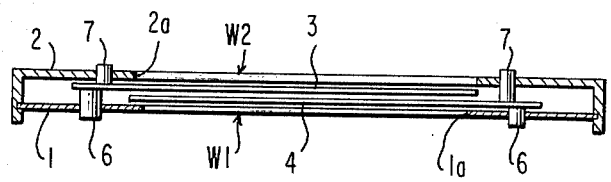
FIG. 2 is a sectional view of the mechanism of FIG. 1 taken about line II — II.

With reference to the drawings, a fixed plate 1 has a rotatable plate 2 rotatably mounted thereon for rotation about an axis P which passes through a first window or opening W1 defined by a quadrilateral opening edge 1a, the rotatable plate 2 being provided with a second window or opening W2 defined by a similarly configured quadrilateral window edge 2a, the windows W1 and W2 being formed of similar rectangular shape and of generally the same size. However, in the illustrated embodiment, the opening W1 defined by edge 1a within the fixed plate 1 is slightly smaller than that of the window W2 formed within the rotatable plate 2 defined by edge 2a.

Shield blades 3 and 4 which are triangular in shape are provided with projection portions 3a and 4a, respectively, at one corner. The fixed plate 1 bears pins 6 fixedly mounted thereto upon which the projections 3a and 4a of blades 3 and 4 are respectively mounted. The pivot pins 6 are symmetrically journaled to the outer frame portion, that is, outside of the window W1 within fixed plate 1. In turn, the blades 3 and 4 carry on projections 3a and 4a respectively, pins 7 which extend outwardly from the surface thereof and are received within elongated dogleg narrow cam slots 5 formed within the rotating plate 2. The cam slots 5 include portions 5a and 5b and are formed within the window frame portion outwardly of the window W2 within the rotating plate 2. The pins 7 are positioned relative to the pivot pins 6 such that upon rotation of the rotating plate 2 relative to the fixed plate 1, the result is the controlled pivoting of the shield blades 3 and 4 towards each other tending to close off the window or opening W1 of the fixed plate 1. The dot-dash line constituting extensions of the dash-dot line within FIG. 1 defined extension portions 3' and 4' for respective blades 3 and 4 which are required when the window or opening W1 within the fixed plate 1 defined by the edge 1a is to be covered only by the pivotable shield blades in which case the dash line 2' forming a circle outside of the periphery of plate 2 designates the increased surfaces area or radial gap required for concealing and accommodating the extension portions 3' and 4' of blades 3 and 4 respectively.

Figure 3:
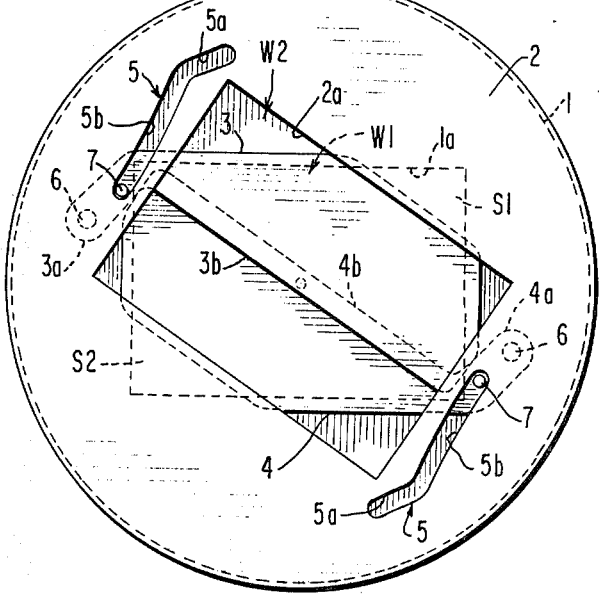
FIG. 3 is a plan view of the mechanism of FIG. 1 in window closed condition.

The operation of the present invention and its construction may be seen by a comparison of FIG. 1 with FIG. 3 and in conjunction with the following description. By rotating plate 2 relative to plate 1 about pivot axis P passing through the windows, shield blades 3 and 4 are pivoted about fixed pivot pins 6 and move in conformance with the dogleg-shaped cam slots 5. When the rotating plate 2 is initially rotated clockwise, as indicated by the arrows, FIG. 1, the pins 7 which are controlled and mvoe along the sides of the cam slots 5 formed within the orating plate 2, in passing along slot positions 5a permit angling or cocking of window W2 relative to window W1. Then both blades 3 and 4 are pivoted about their projections 3a and 4a respectively, clockwise about fixed pivot pins 6, the blades also moving into the light path defined by the opening W1 within the fixed plate 1, and upon the completion of the rotation of the rotating plate 2, the blades assume the position as seen in FIG. 3 where their edges 3b, 4b overlap. Thus, by rotation of the rotating plate 2 relative to the fixed plate 1 about the axis P, the window edge 2a in plate 2 is displaced such that it is angled or slanted with respect to the fixed edge 1a of fixed plate 1 and as a consequence of which the outer frame portion, the window frame portion adjacent the window edge 2a covers the portion of the opening W1 defined by window edge 1a of the fixed plate 1, these portions being indentified as the shaded portions S1 and S2, FIG. 3, the remaining light transmission being shielded by the shield blades 3 and 4 during subsequent pivoting of the blades 3 and 4 which action occurs as pins 7 move along slot portion 5b during completion of rotation of plate 2 with respect to plate 1. Thus, one portion of the window or opening W1 within the fixed plate is covered or shielded by shield blades 3 and 4, while other portions are covered by the portion of the rotatable plate adjacent the window frame edge 2a. The complete light path through the window of the fixed plate 1 is therefore effectively shielded, all of which is accomplished in a simple fashion by rotation of rotatable plate 2 relative to fixed plate 1.

From the above, it will be understood that the mechanism of the present invention may be incorporated as a portion of the view finder eyepiece within a single lens reflex camera or the like to cut off the counter-incident light entering the camera by the simple expedient of rotation of rotating plate 2 relative to fixed plate 1 when necessary through manual operation. In addition, the present mechanism may be disposed within a slide projector or a telescopic photographic lens system to effectively carry out improved projection and photography in respective cases.

According to the present invention, in the state wherein the quadrilateral opening W1 within the fixed plate is partially shielded by rotation of the rotating member wherein angle portions of the window or opening W1 of the fixed plate are covered by the frame portions adjacent the opening or window W2 within the rotating plate, the shield blades may be reduced in area and no extension portions of such shield blades are required. Accordingly, by the mechanism of the present invention in its preferred form, the diameter of the mechanism and therefore its size may be reduced as seen by comparing the contour line 2' to that of the periphery of the rotatable plate 2 and as a consequence the present invention may be readily mounted within any optical system calling for a relatively small size shield mechanism.

Moreover, it will be understood in the present invention that the window or opening of either or both the fixed member and the rotatable member is not limited to a quadrilateral or rectangular opening and that regardless of the configuration of the openings of both the rotatable and fixed member, the angle-shaped portions of the underlying opening of the fixed member may be shielded appropriately by displacement of the rotatable member to thereby achieve effects similar to that obtained within the illustrated embodiment. Further, the construction of the shield blades and the rotating member is not limited to those illustrated in the embodiment but various modifications may be employed in accordance with the end purpose of the mechanism in question. Further, while in the preferred embodiment, the shield blades are pivotably moved into light shielding position from open to closed condition after the rotatable member is initially rotated relative to the fixed underlying member so as to effectively close off the angled portions $S_1$ and $S_2$ of the fixed member opening or window, the sequence may be reversed or the full effect achieved concurrently.

Further, it will be noted that the number, shape and size of the shield blades are not restricted to those described and illustrated in the preferred embodiment and that various other changes may be readily made.

While the invention has been particularly shown and described with reference to a preferred embodiment thereof, it will be understood by those skilled in the art that various changes in form and details may be made therein without departing from the spirit and scope of the invention.

What is claimed is:

1. A light shield mechanism for selectively closing off a light path through a first window within a relatively fixed member, said mechanism comprising:

a rotatable member mounted coplanar to said first member for rotation about an axis passing through said first window and having an opening therein forming a second window, and shield blades mounted for rotation on said fixed member to respective sides of said windows and responsive to relative rotation of said fixed and rotatable members to rotate towards each other to selectively close off said first window with said first and second windows being of such size, location and configuration that rotation of said rotatable member relative to said fixed member causes said rotatable member to partially overlap a portion of said first window with the remainder of said first window being covered by said blades.

2. The light shield mechanism as claimed in claim 1, wherein windows comprise rectangles of similar size within said first and second members, said pivot axis projects through the center of said first window and said shield blades comprise modified triangular plates having base edges in blade open position extending parallel to respective opposed sides of said first window within said first member and having integral projecting portions respectively at a corner thereof extending along first edges of the other two sides of said first window, and wherein said shield blades are pivotably mounted on pivot pins fixed to said first member and extending outwardly thereof.

3. The light shield mechanism as claimed in claim 2, wherein at least said rotatable member comprises a circular plate including elongated cam slots formed therein radially outwards of said second window along opposed sides thereof and said shield blades include pins fixedly mounted thereto and positioned within said elongated slots for controlling pivotable movement of said blades in response to rotation of said rotatable member about said fixed member.

4. The light shield mechanism as claimed in claim 3, wherein said cam slots are doglegged including a first portion permitting rotation of said rotatable member without pivoting of said shield blades as said rotatable member rotates about said pivot axis relative to said fixed member and a second portion causing pivoting of said shield blades.

* * * * *